(12) United States Patent
Gupta

(10) Patent No.: US 8,562,928 B2
(45) Date of Patent: Oct. 22, 2013

(54) PROCESS FOR PRODUCING HYDROGEN, SULFUR AND SULFUR DIOXIDE FROM HYDROGEN SULFIDE-CONTAINING GAS STREAMS

(75) Inventor: Puneet Gupta, Houston, TX (US)

(73) Assignee: Shell Oil Company, Houston, TX (US)

( * ) Notice: Subject to any disclaimer, the term of this patent is extended or adjusted under 35 U.S.C. 154(b) by 286 days.

(21) Appl. No.: 13/238,837

(22) Filed: Sep. 21, 2011

(65) Prior Publication Data
US 2013/0071314 A1 Mar. 21, 2013

(51) Int. Cl.
*C01B 3/04* (2006.01)
*C01B 3/50* (2006.01)
*C01B 17/06* (2006.01)
*C01B 17/52* (2006.01)
*C01B 17/74* (2006.01)
*C10L 3/10* (2006.01)

(52) U.S. Cl.
USPC ........... 423/230; 423/511; 423/522; 423/542; 423/571; 423/648.1; 423/658.2; 48/127.3; 48/127.5

(58) Field of Classification Search
USPC .............. 423/230, 511, 522, 542, 571, 648.1, 423/658.2; 48/127.3, 127.5
See application file for complete search history.

(56) References Cited

U.S. PATENT DOCUMENTS

| | | | |
|---|---|---|---|
| 2,979,384 A | | 4/1961 | Weiner et al. .................... 23/212 |
| 4,039,619 A | * | 8/1977 | Steiner .......................... 423/230 |
| 4,252,778 A | | 2/1981 | Yang et al. ..................... 423/230 |
| 4,397,683 A | * | 8/1983 | Kay et al. ......................... 75/508 |
| 4,439,412 A | | 3/1984 | Behie et al. .................... 423/573 |
| 2002/0155058 A1 | * | 10/2002 | Funakoshi et al. .......... 423/561.1 |
| 2007/0292337 A1 | * | 12/2007 | Startsev et al. ............. 423/576.2 |

FOREIGN PATENT DOCUMENTS

JP 53-130291 A * 11/1978 ................ C01B 1/02

* cited by examiner

Primary Examiner — Timothy Vanoy
(74) Attorney, Agent, or Firm — Charles W. Stewart

(57) ABSTRACT

A process for making molecular hydrogen, elemental sulfur and sulfur dioxide from hydrogen sulfide. The process involves contacting a gas stream of hydrogen sulfide within a contacting zone with a contacting composition comprising metal sulfide in a lower sulfided state and yielding from the contacting zone a product gas stream comprising hydrogen and a recovered contacting composition comprising metal sulfide in a higher sulfided state. The higher metal sulfide is regenerated with oxygen to yield elemental sulfur and sulfur dioxide.

21 Claims, 9 Drawing Sheets

PROCESS FOR PRODUCING HYDROGEN, SULFUR AND SULFUR DIOXIDE FROM HYDROGEN SULFIDE-CONTAINING GAS STREAMS

This invention relates to a process for making hydrogen, sulfur, and sulfur dioxide from hydrogen sulfide-containing gas stream with the use of a metal sulfide to yield hydrogen.

One early process that provides for the production of hydrogen and sulfur from hydrogen sulfide is disclosed in U.S. Pat. No. 2,979,384. This process involves passing gaseous hydrogen sulfide over and contacting it with a lower sulfide of a metal selected from iron, nickel, and cobalt to produce hydrogen and a higher sulfide of the metal as reaction products. The higher sulfide of the metal is then heated to convert the higher sulfide to a lower sulfide and to produce vaporous elemental sulfur. The resulting lower sulfide is again reacted with hydrogen sulfide to produce hydrogen and the higher sulfide thus making the process a cyclic conversion and regeneration of the lower metallic sulfide. The lower metallic sulfide is typically a monosulfide of iron, nickel or cobalt. The two reactions of this process may be represented as follows: (1) $MeS+H_2S=MeS_2+H_2$ and (2) $xMeS_2+Heat=xMeS+S_x$. The '384 patent does not recognize the use of molecular oxygen in the regeneration of the higher metal sulfide by contacting it with molecular oxygen so to convert the higher metal sulfide to a lower metal sulfide and to release heat and yield sulfur dioxide.

U.S. Pat. No. 4,252,778 discloses a process that uses solid particulate sorbents comprising sulfurous iron compounds to desulfurize a gas stream. This is done by contacting the gas stream at an elevated temperature with limestone particulates that comprise iron sulfide. The iron sulfide catalyzes the absorption of sulfurous gases by the limestone. The '778 patent does not disclose anything concerning the use of lower iron sulfide to react with hydrogen sulfide to yield molecular hydrogen and a higher iron sulfide nor does it disclose the regeneration of a higher iron sulfide by contacting it with oxygen to release heat and to yield a lower iron sulfide, sulfur dioxide and sulfur.

U.S. Pat. No. 4,439,412 discloses a process for the decomposition of hydrogen sulfide gas to produce hydrogen and sulfur by using a metal chemical catalyst that may include quantities of cobalt, silicate, iron, alumina, silicon, nickel, vanadium, copper, zinc and sulfur with iron being the most preferred. The metal chemical catalyst is used to convert hydrogen sulfide to yield hydrogen and to chemically bind up the sulfur with the metal chemical catalyst. The metal chemical catalyst is then regenerated by raising its temperature to release gaseous elemental sulfur. When iron is used as the chemical catalyst, the two-step process may be represented by the following reactions: (1) $FeS(s)+H_2S(g) \rightarrow FeS_2(s)+H_2(g)$ and (2) $FeS_2(s) \rightarrow FeS(s)+½S_2(g)$. The '412 patent does not disclose the regeneration of a higher metal sulfide by contacting it with molecular oxygen to convert the higher metal sulfide to a lower metal sulfide to release heat and to yield sulfur dioxide and sulfur.

The prior art indicates that there has been much interest in finding new and useful ways of processing hydrogen sulfide to make hydrogen and sulfur. There is an ongoing need, however, to provide processes that are capable of economically processing hydrogen sulfide to make molecular hydrogen, sulfur, and sulfur dioxide, which may be used as a component in the manufacture of sulfuric acid.

Thus, it is desirable to have a process that can suitably treat a gas stream having a concentration of hydrogen sulfide, and, in particular, a significantly high concentration of hydrogen sulfide, in order to molecular hydrogen, which can be used in a variety of applications.

It further may be desirable for the process to yield sulfur dioxide or elemental sulfur, or both, which have a variety of potential uses.

Accordingly, provided is a process for making hydrogen, sulfur and sulfur dioxide from a hydrogen sulfide-containing gas stream. This process comprises introducing a gas stream comprising hydrogen sulfide into a sulfidation zone, operated under suitable sulfidation conditions and containing a lower metal sulfide, and contacting therein said gas stream with said lower metal sulfide to thereby yield molecular hydrogen and a higher metal sulfide; passing from said sulfidation zone a treated gas stream containing molecular hydrogen and having a reduced hydrogen sulfide concentration; passing from said sulfidation zone said higher metal sulfide and introducing it into a regeneration zone; introducing a sub-stoichiometric amount of molecular oxygen into said regeneration zone and contacting said higher metal sulfide with said molecular oxygen for a shortened contacting time to thereby convert said higher metal sulfide to said lower metal sulfide and to yield sulfur dioxide and elemental sulfur; passing from said regeneration zone said lower metal sulfide and introducing it into said sulfidation zone; and passing from said regeneration zone a regeneration zone effluent comprising sulfur dioxide and elemental sulfur.

Figure 1:
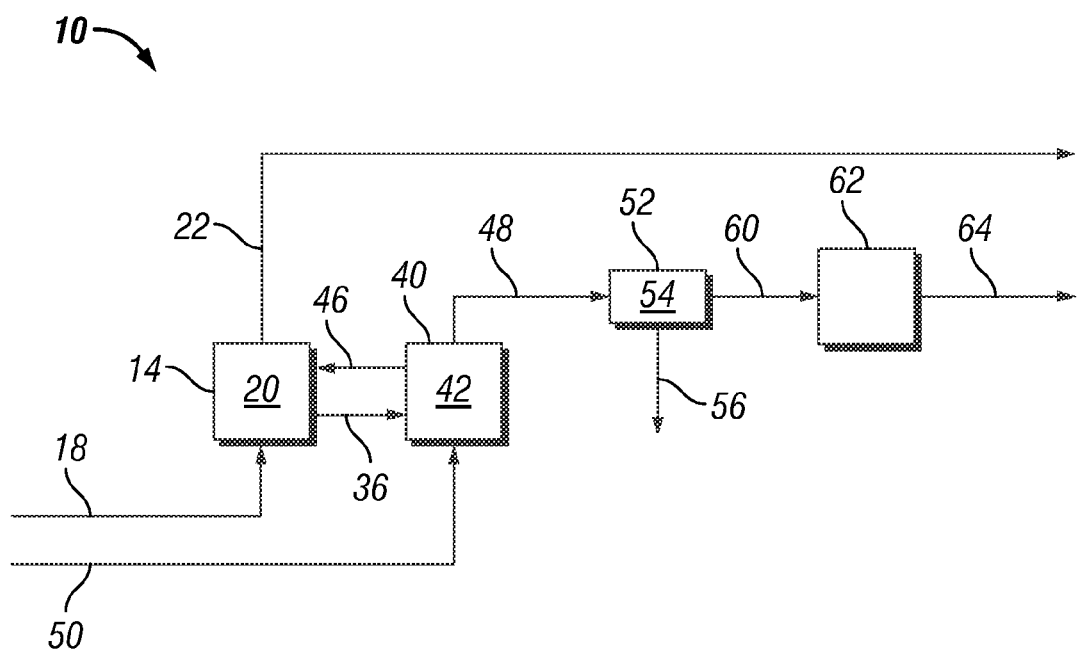
FIG. 1 is a process flow schematic that presents one or more embodiments of the inventive process for making molecular hydrogen, sulfur and sulfur dioxide from hydrogen sulfide.

One advantage of the inventive process is that it can provide for the conversion of hydrogen sulfide to molecular hydrogen, elemental sulfur, and sulfur dioxide. Hydrogen can be a valuable product having many different applications such as uses as a chemical reactant, or in refinery operations, or in other applications. The direct production of elemental sulfur is advantageous because it can eliminate the need for Claus units for the production of sulfur. Also, there is no production of molecular hydrogen with the Claus process. The sulfur dioxide may be used as a feedstock to plants for the manufacture of sulfuric acid or sulfonate based surfactants.

The gas stream to be processed by the inventive process is to comprise hydrogen sulfide. Generally, hydrogen sulfide will be the main component of the gas stream, and, typically, the gas stream will comprise hydrogen sulfide at a concentration exceeding 20 volume percent, but, more typically, the hydrogen sulfide concentration will exceed 25 volume percent, or 50 volume percent. It is preferred, however, for the hydrogen sulfide concentration of the gas stream to exceed 70 volume percent or even 80 volume percent. The practical upper limit for the hydrogen sulfide concentration in the gas stream is less than about 99 volume percent, but, more typically, the upper limit for the hydrogen sulfide concentration is less than 95 volume percent and, even, less than 90 volume percent. The gas stream of the inventive process can further comprise any one or more of the hydrocarbons methane, ethane, propane, n-butane, isobutane, or one or more of the pentanes. The gas stream may be taken from any source including natural gas streams produced from reservoirs of natural gas having exceptionally high concentrations $H_2S$ and gas streams generated by refineries, such as the acid gas streams from amine units or any other generated refinery gas stream having a high concentration of $H_2S$.

The preferred hydrocarbons of the gas stream are typically those lower molecular weight hydrocarbons that are normally in the gaseous state at 0° C. (32° F.) and 100 kPa. Examples of such lower molecular weight hydrocarbons include methane, ethane, propane, n-butane, and isobutane. Thus, the gas stream can comprise at least one hydrocarbon component that is typically a hydrocarbon selected from the group consisting of methane, ethane, propane, n-butane, isobutene, pentanes, and any combination of one or more thereof. The more typical hydrocarbon component of the gas stream is methane.

The amount of hydrocarbons contained in the gas stream can exceed about 1 volume percent (vol. %) or 5 vol. % or 10 vol. % and be in the range up to about 80 volume percent. But, for certain embodiments of the process, hydrocarbons contained in the gas stream can exceed 25 volume percent and can be in the range of up to 75 volume percent of the gas stream. In, still other embodiments, the hydrocarbons can be present in the gas stream at a concentration exceeding 50 volume percent. One particular feature of the inventive process is that it is capable of processing gas streams having exceptionally high concentrations of $H_2S$ including those gas streams, such as the acid gas streams that are generated by petroleum refineries and are typically charged to conventional Claus units, and, thus, the gas stream of the inventive process, in some instances, can comprise almost entirely $H_2S$ and in most instances it is no lower than or greater than 20 vol. % $H_2S$.

As earlier mentioned, the inventive process provides for the conversion of hydrogen sulfide ($H_2S$) to hydrogen that has a variety of uses and applications, and it provides for the direct manufacture of elemental sulfur instead of using the conventional Claus process which combusts $H_2S$ with oxygen to make $SO_2$ that is reacted with $H_2S$ to yield elemental sulfur. The sulfur dioxide manufactured by the process may be used as a feed to a Claus unit or as a component in the manufacture of sulfuric acid.

The inventive process utilizes a lower metal sulfide, represented herein as $MS_x$, which reacts with the $H_2S$ to form a higher metal sulfide, represented herein as $MS_y$, wherein y is greater than x (i.e., y>x), and molecular hydrogen, $H_2$. This sulfidation reaction is represented by the following reaction equation:

$$MS_x + (y-x)H_2S \Rightarrow MS_y + (y-x)H_2, \text{ wherein } y>x \quad (I)$$

In a second step of the process, the higher metal sulfide resulting from the sulfidation step undergoes a regeneration in order to convert it back into the lower valence state of the lower metal sulfide. This is done by contacting the higher metal sulfide with molecular oxygen under appropriate reaction conditions. The regeneration reactions result in converting the higher metal sulfide to the lower metal sulfide and yielding either sulfur dioxide ($SO_2$) or elemental sulfur (S), or both. The regeneration reactions are represented by the following reaction equations:

$$MS_y + (y-x)O_2 = MS_x + (y-x)SO_2 + \text{heat} \quad (II)$$

or $$MS_y + \text{heat} = MS_x + (y-x)S \quad (III)$$

Reaction (II) is exothermic. The heat release from reaction (II) can provide heat energy to drive the decomposition of the higher metal sulfide to yield elemental sulfur as represented by reaction (III). The metal sulfide compound of the process may be selected from any available metal sulfide compound having properties required by the process. Such required properties include the ability of the lower metal sulfide to react with hydrogen sulfide to yield molecular hydrogen and a higher metal sulfide. The higher metal sulfide should be regenerable in the since that it may be converted back to a lower form of the metal sulfide that is reusable in the conversion of hydrogen sulfide to molecular hydrogen, and its regeneration should result in yielding either elemental sulfur or sulfur dioxide, or both elemental sulfur and sulfur dioxide.

Certain metallic elements found to form suitable lower metal sulfides include those selected from the group of metals consisting of iron (Fe), nickel (Ni), cobalt (Co), copper (Cu), lead (Pb) tin (Sn), and sodium (Na). Among these metals, iron and nickel are the preferred metal of the metal sulfides that are useful in the process. Examples of some of the lower forms of the metal sulfides include FeS, $Fe_7S_8$, NiS, $Ni_2S_3$, CoS, $Co_9S_8$, $S_3S_4$, $Na_2S$, $Na_2S_2$, and $Na_2S_3$. Both lead and tin may decompose to the metallic form which is convertible into the sulfide form. Examples of some of the higher forms of the metal sulfides that can be used in the process include $FeS_2$, $NiS_2$, $CoS_2$, $CuS_2$, PbS, $Sn_2S_3$, $Na_2S_z$ (wherein z=3 or 4 or 5 or 6). The preferred metal sulfides for use in the process are the sulfides of iron or nickel.

The metal sulfide of the process may be in any form that suitably allows its use in the reactors or reaction zones of the process. For example, the metal sulfide may be in the form of small fluidizable particles comprising the metal sulfide. Also, the metal sulfide may be composited with an inert material, such as the inorganic metal oxides of alumina, silica, titania and the like, or the metal sulfide may be composited with reactive components, or the metal sulfide may be composited with both inert material and reactive components, and then shaped into formed particles that may be used in the reactors or reaction zones of the process.

In the sulfidation step of the inventive process, a gas stream comprising an exceptionally high hydrogen sulfide concentration is introduced into a sulfidation reactor wherein the gas stream is contacted with a composition that comprises a lower metal sulfide. The sulfidation reactor, typically, is a vessel which defines a sulfidation zone and provides means for containing the lower metal sulfide and for contacting the gas stream with the lower metal sulfide under suitable sulfidation reaction conditions. The sulfidation reactor may provide for and contain a fluidized bed or a fixed bed or a moving fixed bed of the lower metal sulfide reaction material of the process. The gas-solid contact is preferred to take place in a countercurrent fashion.

The sulfidation reaction conditions are any suitable conditions that promote the reaction of the lower metal sulfide and hydrogen sulfide to a higher metal sulfide and molecular hydrogen. The sulfidation reaction temperature within the sulfidation zone though dependent on the choice of the lower metal sulfide used, can be in the range of from 150° C. to 700°

C. Preferably, the sulfidation reaction temperature of the sulfidation zone is in the range of from 250° C. to 550° C., and, more preferably, the sulfidation temperature is in the range of from 300° C. to 500° C. The sulfidation reaction equilibrium is not significantly dependent upon the reaction pressure, however the rate of reaction will significantly increase with increasing pressure and, thus, sulfidation reaction pressure can be in the range of from about atmospheric to about 13,840 kPa (2,000 psig), and, preferably, from about 136 to 3,450 kPa (5 to 500 psig).

The theoretical amount of lower metal sulfide that is contacted with the hydrogen sulfide within the sulfidation zone is the stoichiometric quantity as determined by the sulfidation reaction of reaction equation (I). However, it may be desirable, or even necessary, to contact the lower metal sulfide with an excess above the stoichiometric amount of hydrogen sulfide, or, alternatively, to contact the lower metal sulfide with less than the stoichiometric amount of hydrogen sulfide. Thus, the ratio of moles of lower metal sulfide per moles of hydrogen sulfide introduced into the sulfidation zone is generally in the range of from 0.1:1 to 10:1. Preferably, this molar ratio is in the range of from 0.25:1 to 5:1, and, more preferably, the molar ratio is in the range of from 0.5 to 3.

The contacting of the hydrogen sulfide of the gas stream with the lower metal sulfide under sulfidation reaction conditions yields molecular hydrogen and a higher metal sulfide. A treated gas stream having a reduced hydrogen sulfide concentration that is significantly less than the hydrogen sulfide concentration of the gas stream that is introduced into the sulfidation zone is withdrawn and passed from the sulfidation zone. Generally, the reduced hydrogen sulfide concentration of the treated gas stream should be less than 10 vol. % (100,000 ppmv). It is preferred for the reduced hydrogen sulfide concentration of the treated gas stream to be as low as is possible, and, thus, it can be less than 8 vol. % or even less than 5 vol. %. In certain embodiments of the inventive process, the reduced hydrogen sulfide concentration of the treated gas stream can be less than 3 vol. % or less than 1 vol. %.

The amount of hydrogen in the treated gas stream is dependent upon the amount of hydrogen sulfide contained in the gas stream that is treated and the extent of the conversion of the hydrogen sulfide to hydrogen by the sulfidation step. However, based on reaction (I), there is one mole of hydrogen that is yielded for each mole of hydrogen sulfide that is converted in the sulfidation step, and the theoretical amount of hydrogen that is contained in the treated gas stream may be easily calculated by those skilled in the art if the composition of the gas stream and the extent of the hydrogen sulfide conversion are known.

The higher metal sulfide that results from the sulfidation step of the process is then removed and passed from the sulfidation zone and introduced into a regeneration zone defined by a regenerator. It is understood that the sulfidation step may be a batch process step or a continuous process step. With a batch process step, the lower metal sulfide is reacted with hydrogen sulfide until such an amount of the lower metal sulfide is converted that the metal sulfide becomes spent, at which time, the contacting of the gas stream is stopped and the resulting metal sulfide material is removed from the sulfidation zone to be introduced into the regenerator of the process. The alternative sulfidation process step involves a continuous removal of metal sulfide that has undergone sulfidation from the sulfidation zone while simultaneously introducing regenerated lower metal sulfide into the sulfidation zone. Preferably, the gas stream is contacted the lower metal sulfide solid in a countercurrent fashion.

The regenerator defines a regeneration zone and provides means for regenerating the higher metal sulfide received from the sulfidation zone in order to convert it to the lower metal sulfide that is passed from the regeneration zone and introduced into the sulfidation zone. Also, the regenerator provides for the conversion of the higher metal sulfide to yield elemental sulfur, or sulfur dioxide, or both elemental sulfur and sulfur dioxide. Molecular oxygen is introduced into the regeneration zone and is contacted with the higher metal sulfide that is contained therein and received from the sulfidation zone. The contacting of the higher metal sulfide with oxygen is done under regeneration conditions that suitably provide for the conversion of the higher metal sulfide to the lower metal sulfide in accordance with either reaction (II) or reaction (III), or both reactions (II) and (III). The regeneration reaction, thus, may include yielding of either sulfur dioxide ($SO_2$) or elemental sulfur, or both $SO_2$ and S. Molecular oxygen may be provided as pure oxygen or preferentially as air.

It is an important aspect of the inventive process to expose the higher metal sulfide to be regenerated within the regeneration zone to less than stoichiometric amounts of molecular oxygen. As used in this specification, a stoichiometric amount of molecular oxygen is considered to be the theoretical amount of oxygen that is required to convert a higher metal sulfide compound to its corresponding metal oxide form and to yield the corresponding theoretical amount of sulfur dioxide as defined by the reaction of equation (II) above. For example, the stoichiometric amount of oxygen required to convert one mole of nickel disulfide ($NiS_2$) to nickel oxide (NiO) and two moles of sulfur dioxide ($SO_2$) is equivalent to two and a half moles of oxygen. Thus, for the higher nickel sulfide, a less than stochiometirc amount of oxygen, i.e., a sub-stoichiometic amount of molecular oxygen, is something less than two and a half moles of oxygen per mole of $NiS_2$.

It can be one of the desired aspects of the inventive process to minimize the amount of $SO_2$ that is produced by the step for regenerating a higher metal sulfide to thereby yield its lower metal sulfide, and this is done by utilizing a sub-stoichiometric amount of oxygen that is introduced into the regeneration zone and contacted with the higher metal sulfide introduced therein from the sulfidation zone. Also, the amount of $SO_2$ that is produced by the higher metal sulfide in the regeneration step is influenced by the contact time within the regenerator of the higher metal sulfide with the molecular oxygen. The contact time is defined herein to be the time an average higher metal sulfide particle spends inside the regeneration reaction zone such that the units reported for contact time is in minutes (min).

Either the amount of oxygen introduced into the regenerator or the contact time of the oxygen with the higher metal sulfide may be controlled so as to provide a desired sulfur yield from the regenerator. But, in certain other embodiments of the inventive process, a sub-stoichiometric amount of molecular oxygen is used along with a controlled shortened contact time so as to provide a desired sulfur yield from the regenerator. The sulfur yield is defined as the molar ratio of S to S plus $SO_2$, i.e., $S/(S+SO_2)$. It is desired to control the amount of oxygen introduced into the regenerator to a sub-stocihiometric amount, and, optionally, the contact time, so as to provide a molar sulfur yield that is in the range of from 0.1 to 0.95. It is preferred for the molar sulfur yield to be in the range of from 0.2 to 0.85, and, more preferred, the molar yield ratio is in the range of from 0.4 to 0.8.

The sub-stoichiometric amount of oxygen introduced into the regeneration zone should be less than the theoretical stoichiometric amount of molecular oxygen required to convert the higher metal sulfide introduced into the regeneration zone. Thus, the ratio of sub-stoichiometric amount of oxygen to theoretical stoichiometric amount of oxygen is less than 1, and, generally, it should be in the range from 0.001 to about 0.7. In some embodiments of the inventive process, the ratio of sub-stoichiometric amount of oxygen to theoretical stoichiometric amount of oxygen is in the range of from 0.01 to 0.45, and, preferably, it is in the range of from 0.01 to 0.3.

The contact time, as defined herein, of oxygen with the higher metal sulfide is generally in the range of from 0.1 sec to 60 min. It is preferred for the contact time to be in the range of from 0.5 sec to 20 min The most practical source of oxygen for introduction into the regeneration zone and contacting with the higher metal sulfide is air, but any other suitable source of oxygen may be used as well.

In addition to the regeneration reaction conditions described above, any other suitable conditions that promote the reaction of the higher metal sulfide and molecular oxygen to yield the lower metal sulfide and $SO_2$ or S, or both, may be applied. Generally, the regeneration reaction temperature is in the range of from 200° C. to 900° C. Preferably, the regeneration reaction temperature of the regeneration zone is in the range of from 350° C. to 850° C., and, more preferably, the regeneration temperature is in the range of from 400° C. to 800° C. The operating temperature of the regeneration zone may be controlled by preheating the oxygen source that is introduced into the regeneration zone. Due to reaction (II) being an exothermic reaction, a portion of the heat energy required for operating the regeneration zone may be supplied by this reaction.

The regeneration reactions are not significantly dependent upon the regeneration pressure, and, thus, the regeneration reaction pressure can be in the range of from atmospheric to 13,840 kPa (2,000 psig), and, preferably, from about 136 to 3,450 kPa (5 to 500 psig).

The resulting lower metal sulfide generated by the regeneration of the higher metal sulfide received by the regenerator from the sulfidation zone is then passed back to the sulfidation zone for reuse thereby providing for a continuous process of metal sulfide sulfidation and metal sulfide regeneration.

With the proper operation of the regenerator, a regeneration zone effluent is yielded and passed from the regenerator to be further processed. Thus, the regeneration zone effluent comprises sulfur dioxide and elemental sulfur, and, generally, the relative proportions of sulfur and sulfur dioxide contained in the regeneration zone effluent are such that the molar ratio of S to S plus $SO_2$, i.e., $S/(S+SO_2)$ is in the range of from 0.1 to 0.9. In the typical operation of the process air is used as the source of molecular oxygen, and, thus, the regeneration zone effluent will also comprise a large concentration of molecular nitrogen. In certain embodiments of the invention, the regeneration zone effluent comprises sulfur and sulfur dioxide in amounts such that the molar ratio of $S/(S+SO_2)$ is in the range of from 0.2 to 0.85 or in the range of from 0.4 to 0.8.

Sulfur is recovered from the regenerator zone effluent by passing it to a sulfur condenser that defines a sulfur condensation zone and provides means for removing heat energy from the gaseous sulfur contained in the regenerator zone effluent so as to condense the sulfur. Sulfur condensers are known to those skilled in the art and any suitable sulfur condenser may be used to condense the sulfur from the regeneration zone effluent to yield a sulfur condenser effluent stream. The sulfur condenser effluent stream will have a reduced sulfur concentration and sulfur dioxide.

The sulfur dioxide of the sulfur condenser effluent stream has value as a reactant in the manufacture of sulfuric acid, and, thus, the sulfur condenser effluent stream with its concentration of sulfur dioxide may be passed to a sulfuric acid production plant whereby the sulfur dioxide is used as a reactant for the production of sulfuric acid. Various methods of manufacture of sulfuric acid are well known to those skilled in the art and the sulfur condenser effluent stream may be charged to any suitable process for the manufacture sulfuric acid. One example of a process for the manufacture of sulfuric acid which uses sulfur dioxide as a reactant is the so-called contact process.

Alternately, the sufur dioxide may be used in the manufacture of surfactants. These primarily comprise sulfonate based surfactants and their process of manufacture is known to those skilled in the art.

Reference is now made to the process flow schematic of FIG. 1, which includes for illustrative purposes various embodiments of the inventive metal sulfide process 10 for making hydrogen and either sulfur dioxide or elemental sulfur, or both, from a gas stream comprising hydrogen sulfide. The gas stream, comprising hydrogen sulfide is introduced into a sulfidation reactor 14 by way of conduit 18. Sulfidation reactor 14 is typically a vessel that defines a sulfidation reaction zone 20 which contains a lower metal sulfide. The sulfidation reaction zone 20 is operated under suitable sulfidation conditions so as to promote the reaction of hydrogen sulfide that is in the gas stream with the lower metal sulfide when contacted therewith to thereby yield molecular hydrogen and a higher metal sulfide. A treated gas stream comprising molecular hydrogen generated by the reaction of the lower metal sulfide with hydrogen sulfide is passed from sulfidation reaction zone 20 by way of conduit 22.

A higher metal sulfide that is yielded by the sulfidation step is removed and passes from sulfidation zone 20 by way of conduit 36 and is introduced into regenerator 40. Regenerator 40 is typically a vessel that defines a regeneration zone 42. An oxygen-containing regeneration gas stream passes by way of conduit 50 and is introduced into regeneration zone 42 is operated under suitable regeneration conditions to promote the reaction of the higher metal sulfide to its corresponding lower metal sulfide and to yield either sulfur dioxide or sulfur, or both sulfur dioxide and sulfur. The regenerated lower metal sulfide is then passed from regeneration zone 42 by way of conduit 46 to be introduced into sulfidation zone 20.

A regenerator gas that comprises either sulfur dioxide or sulfur, or both, passes from regeneration zone 42 by way of conduit 48 to sulfur condenser 52. Sulfur condenser 52 defines a sulfur condensation zone 54 and provides means by which the elemental sulfur of the regeneration zone effluent is condensed therefrom. The condensed sulfur passes from sulfur condensation zone 54 through conduit 56. The sulfur condenser effluent stream, comprising sulfur dioxide and having a reduced sulfur concentration, passes from sulfur condensation zone 54 by way of conduit 60 to be charged to sulfuric acid production unit 62 whereby the sulfur dioxide is used as a reactant for the production of sulfuric acid. The sulfuric acid product is yielded from the sulfuric acid production unit 62 through conduit 64.

The following examples are to illustrate various embodiments of the invention, but they are not intended to limit the invention in any way.

EXAMPLE 1

Thermogravimetric Analysis Experiments

This Example 1 describes the thermogravimetric analysis (TGA) experiments conducted with various higher metal sulfides in order to determine their regeneration characteristics whereby the lower sulfide phase is obtained through reaction of the higher metal sulfide with air (i.e., molecular oxygen) and/or an inert gas ($N_2$). These experiments helped in the determining the extent of formation of unwanted metal oxide that occurs in the regeneration of the higher metal sulfide.

The TGA experiments consisted of taking a sample of less than 20 mg of the metal sulfide and exposing it to either a nitrogen or an oxygen-containing atmosphere as the temperature was raised over time from an ambient temperature to 800° C. The temperature, temperature change and sample weight were measured during the experiment. The weight change of the sample was used to deduce the changes that took place in the sulfide phase as a function of temperature and gas environment.

In the first type of experiments, samples of the various higher metal sulfides were exposed to an atmosphere of pure nitrogen ($N_2$) while raising the exposure temperature slowly from ambient temperature to 300° C. and then from 300° C. to 800° C. This allowed the decomposition characteristics of each higher metal sulfide when exposed to an inert atmosphere, i.e., nitrogen, to be studied. After the weight of the metal sulfide had stabilized at the 800° C. temperature, the metal sulfide was then exposed to an atmosphere of an oxygen-containing gas, i.e., air, and allowed to undergo complete oxidation, which provided a weight baseline that allowed the determination of the different phases of the testing material that existed during the experiment. The results of these experiments may be depicted by what are referred to herein as decomposition plots.

The second type of experiments involved raising the temperature of the higher metal sulfide to 300° C. in an nitrogen atmosphere followed by exposing the sample to an atmosphere of an oxygen-containing gas as the temperature was raised to 800° C. This allowed for a study or observation of the oxidation characteristics of the higher metal sulfide. The results of these experiments may be depicted by what are referred to herein as oxidation characteristics plots.

EXAMPLE 2

Presentation of Results of TGA Experiments

This Example 2 presents results of the TGA experiments described in Example 1 for various metal sulfides including $FeS_2$, $NiS_2$, $CoS_2$, $CuS$, $PbS$ and $Sn_2S_3$. The results presented herein demonstrate that it is possible to obtain a lower sulfide form of iron, nickel, cobalt, copper, lead or tin by reacting the respective higher sulfide form with oxygen.

$FeS_2$

Figure 2:
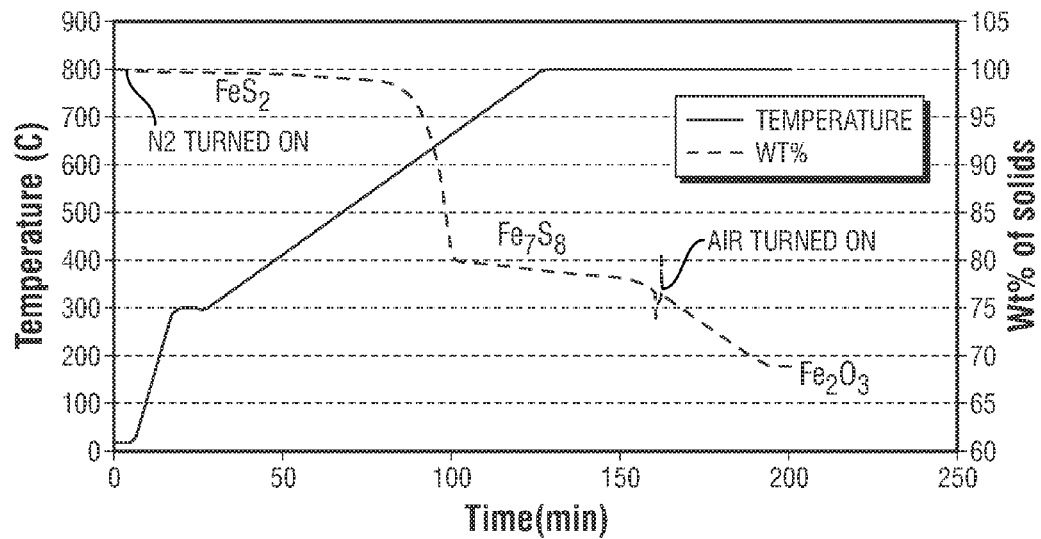
FIG. 2 is a decomposition plot for $FeS_2$.
Figure 3:
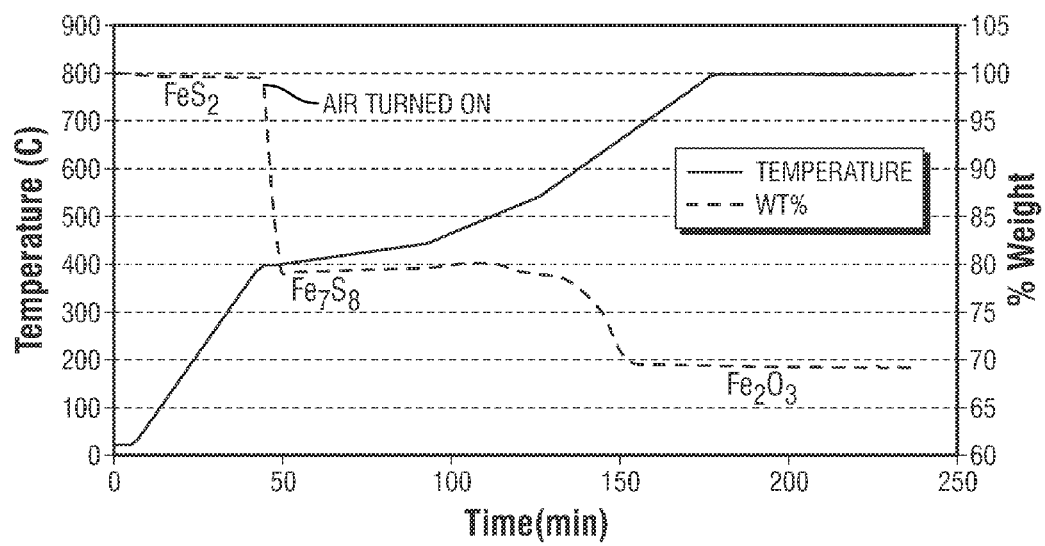
FIG. 3 is an oxidation characteristics plot for $FeS_2$.

The decomposition plot for $FeS_2$ is shown in FIG. 2. It is observed that at around 600° C. $FeS_2$ decomposed to $Fe_7S_8$ which was relatively stable at higher temperatures. Turning on air caused complete oxidation to $Fe_2O_3$. FIG. 3 shows the oxidation characteristics of $FeS_2$. On contacting the higher iron sulfide, $FeS_2$, with air at 300° C., there was rapid oxidation to $Fe_7S_8$. It should be noted that no oxide was observed from the weight trend at this stage. In fact, $Fe_7S_8$ was quite stable to further decomposition/oxidation as the temperature was raised. Only above 600° C. did it finally oxidize to $Fe_2O_3$.

The TGA results demonstrate that $FeS_2$ can be regenerated with air to provide a lower sulfide ($Fe_7S_8$) without the formation of oxides. The results suggest that iron oxide formation may be avoided by carefully controlling the temperature around 600° C.

$NiS_2$

Figure 4:
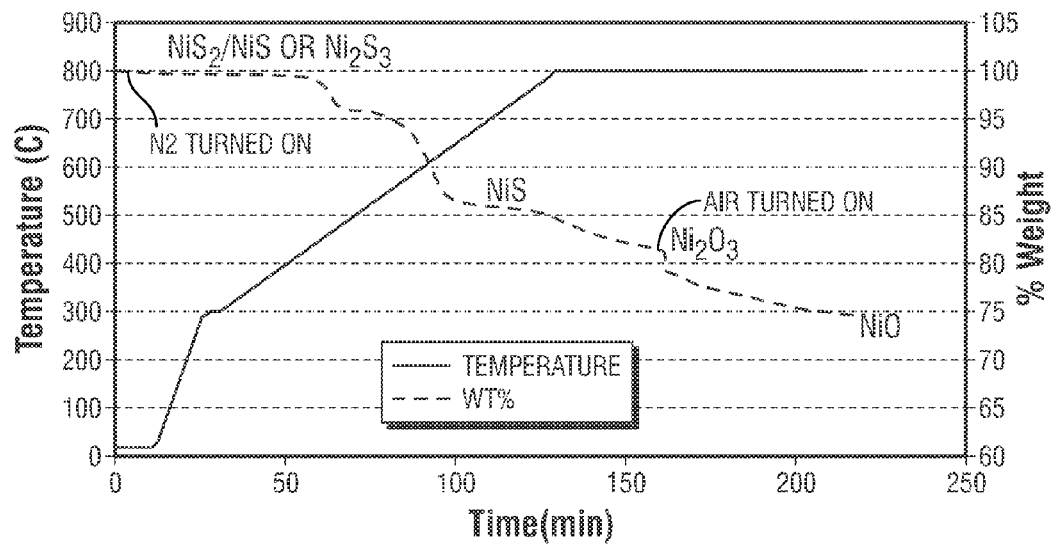
FIG. 4 is a decomposition plot for $NiS_2$.
Figure 5:
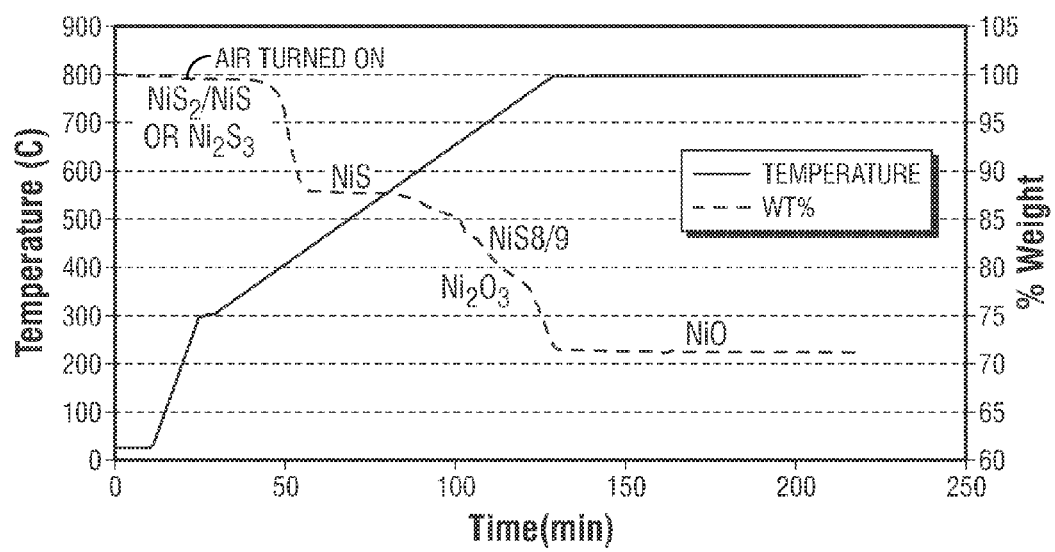
FIG. 5 is an oxidation characteristics plot for $NiS_2$.

FIG. 4 and FIG. 5 respectively show the decomposition and oxidation characteristics of $NiS_2$. FIG. 4 shows that under a $N_2$ environment, $Ni_2S_3$ decomposes to NiS in the 550-600° C. temperature window. There is further slow decomposition at higher temperatures. FIG. 5 shows that in the presence of oxygen the transition of the higher nickel sulfide to NiS took place at 400° C. No indication of oxide formation was seen at this temperature. The further raising of the temperature led to slow formation of $Ni_9S_8$ followed by slow oxidation to NiO.

$CoS_2$

Figure 6:
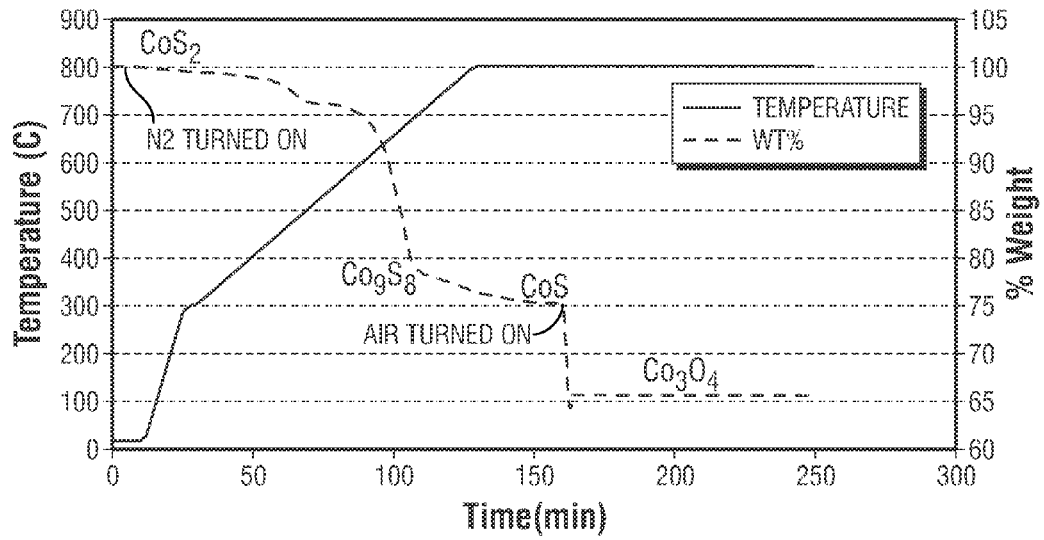
FIG. 6 is a decomposition plot for $CoS_2$.
Figure 7:
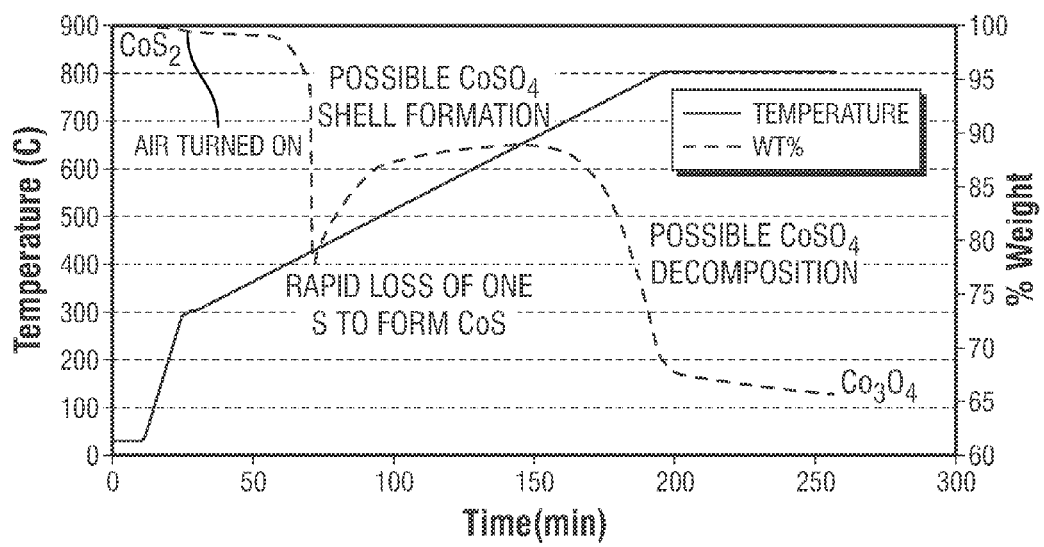
FIG. 7 is an oxidation characteristics plot for $CoS_2$.

FIG. 6 presents a decomposition plot for $CoS_2$. $CoS_2$ rapidly loses one sulfur atom to form CoS at temperatures above 600° C. The air oxidation results are shown in FIG. 7. There is a rapid loss of one sulfur atom at 400° C. However as soon as the desulfurization is over, potential oxidation to the sulfate form takes over. This sulfate was decomposed at temperatures exceeding 700° C. to the final oxide form.

Figure 8:
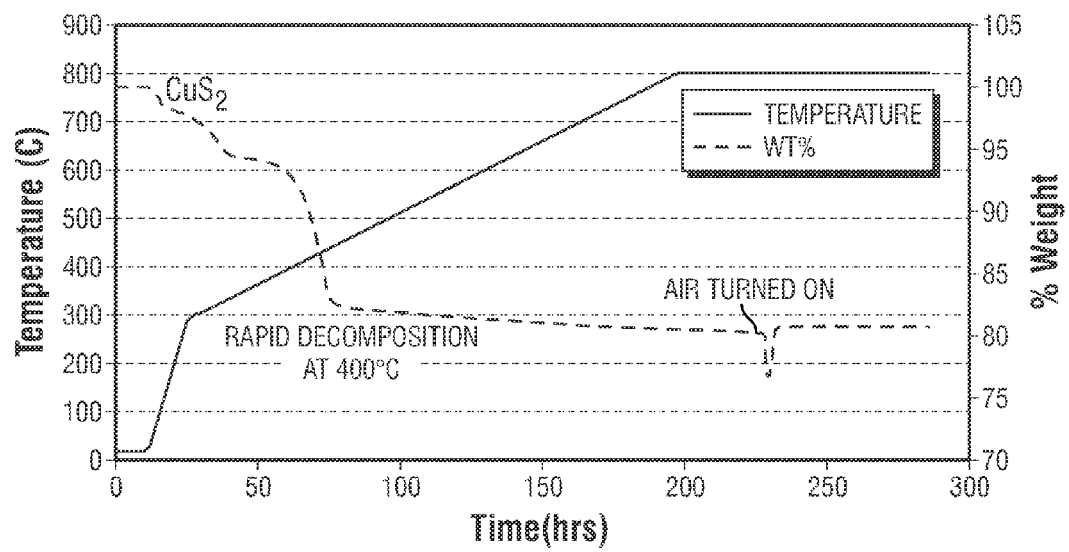
FIG. 8 is a decomposition plot for $CuS_2$.
Figure 9:
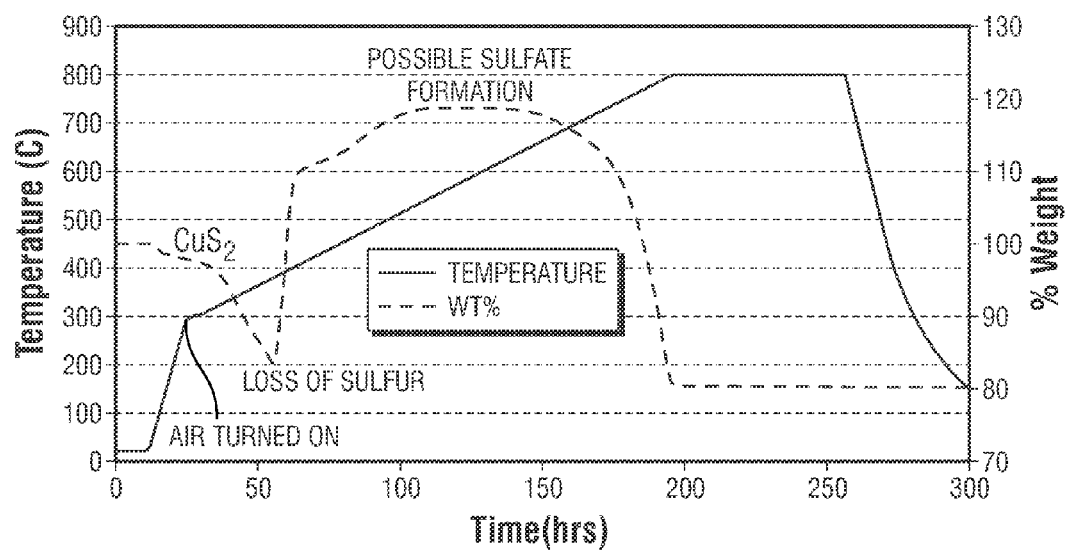
FIG. 9 is an oxidation characteristics plot for $CuS_2$.

$CuS_2$ $CuS_2$ showed similar characteristics as $CoS_2$ but at lower temperatures. FIG. 8 shows that decomposition of $CuS_2$ in an inert environment took place at about 400° C. FIG. 9 shows that during oxidation there was loss of sulfur starting at 310° C., however, possible sulfate formation took over. The exact phases could not be identified due to mismatch in the stoichiometry and experimental data. Most likely this was caused due to impurities and oxides in the $CuS_2$ sample taken.

PbS

Figure 10:
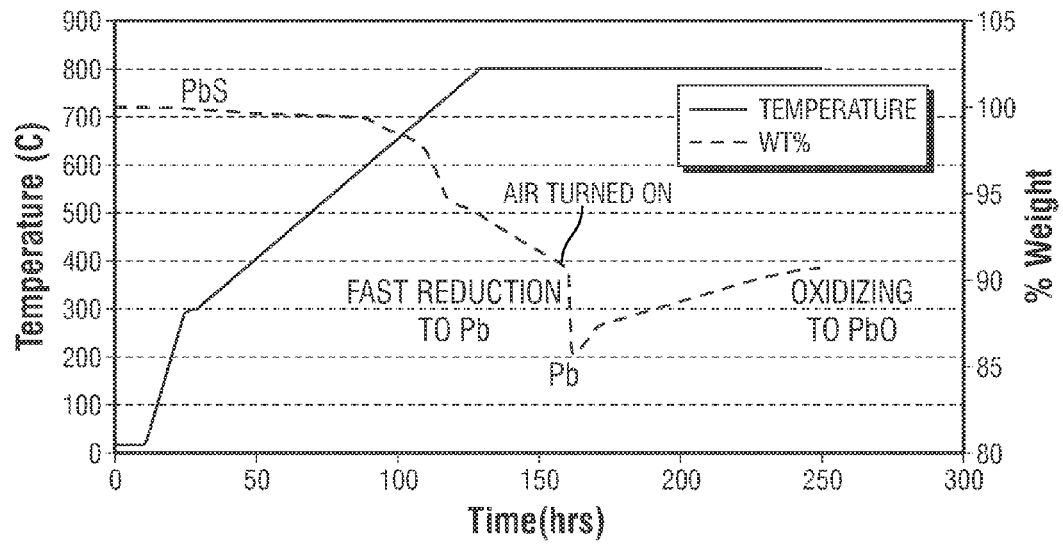
FIG. 10 is a decomposition plot for $PbS$.

Lead exhibits only the monosulfide form. However, the TGA decomposition data presented in FIG. 10 shows that it can be oxidized to lead metal with oxygen-containing gas with careful control of the contact time. If the contact time is exceeded, then PbO is formed. It is expected that metallic lead will react rapidly with $H_2S$ to form $H_2$.

$Sn_2S_3$

Figure 11:
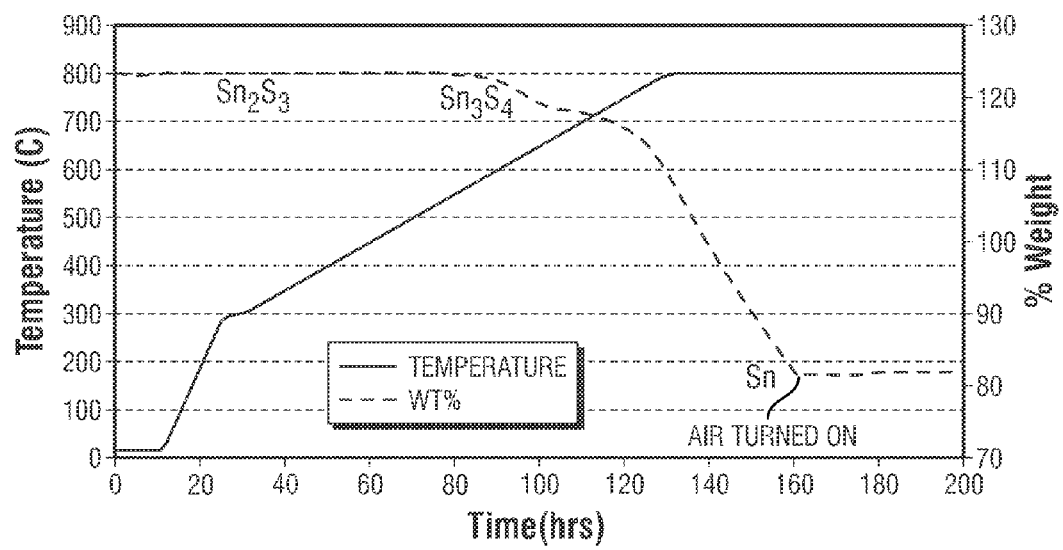
FIG. 11 is a decomposition plot for $Sn_2S_3$.

A similar behavior to Pb was shown by tin sulfide as depicted in FIG. 11, where the metallic form was obtained on decomposition at 800° C.

$Na_2S_4$

Figure 12:
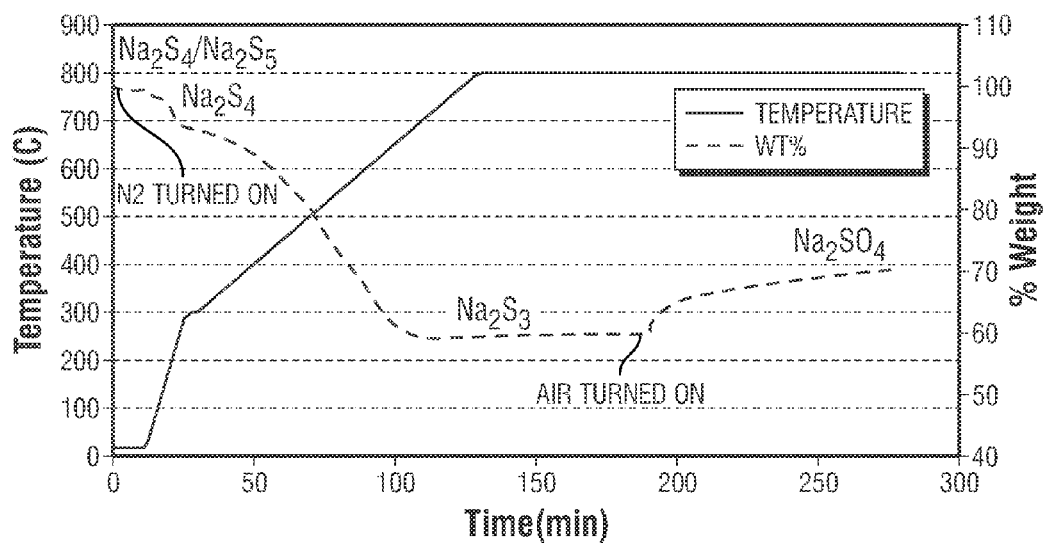
FIG. 12 is a decomposition plot for $Na_2S_4$.
Figure 13:
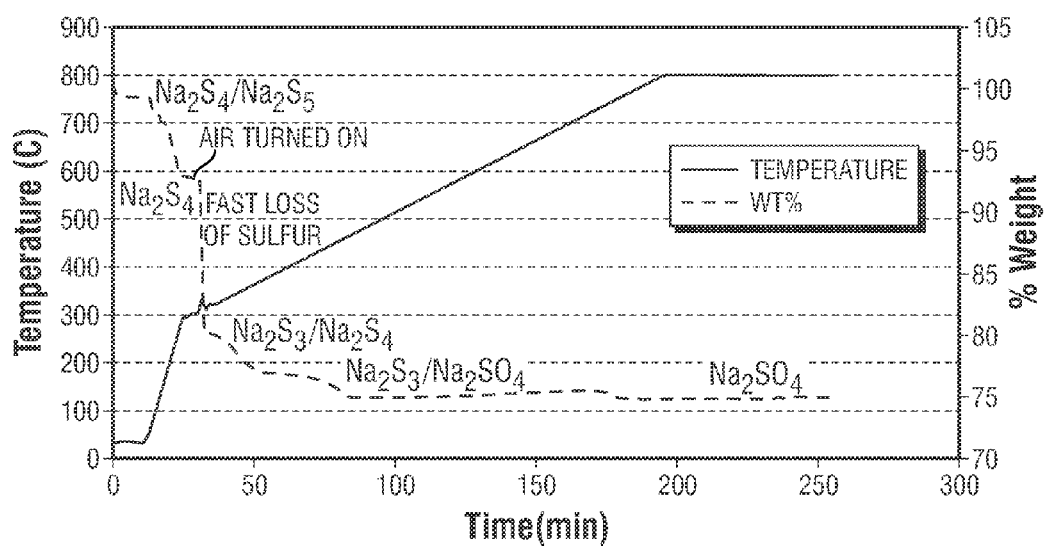
FIG. 13 is an oxidation characteristics plot for $Na_2S_4$.
Figure 14:
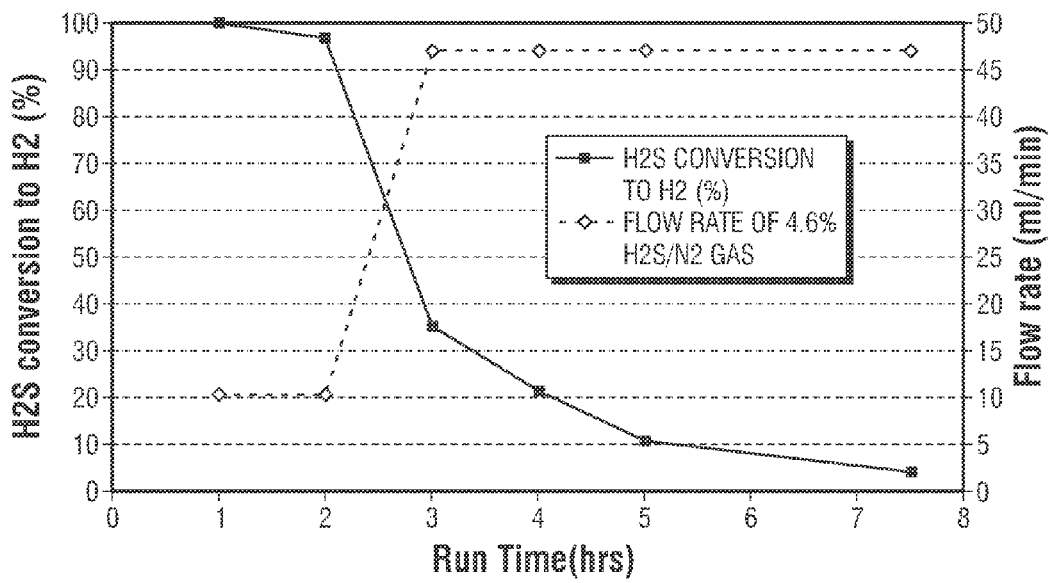
FIG. 14 is a plot showing conversion of $H_2S$ to $H_2$ using $Ni_3S_2$ at 400° C.
Figure 15:
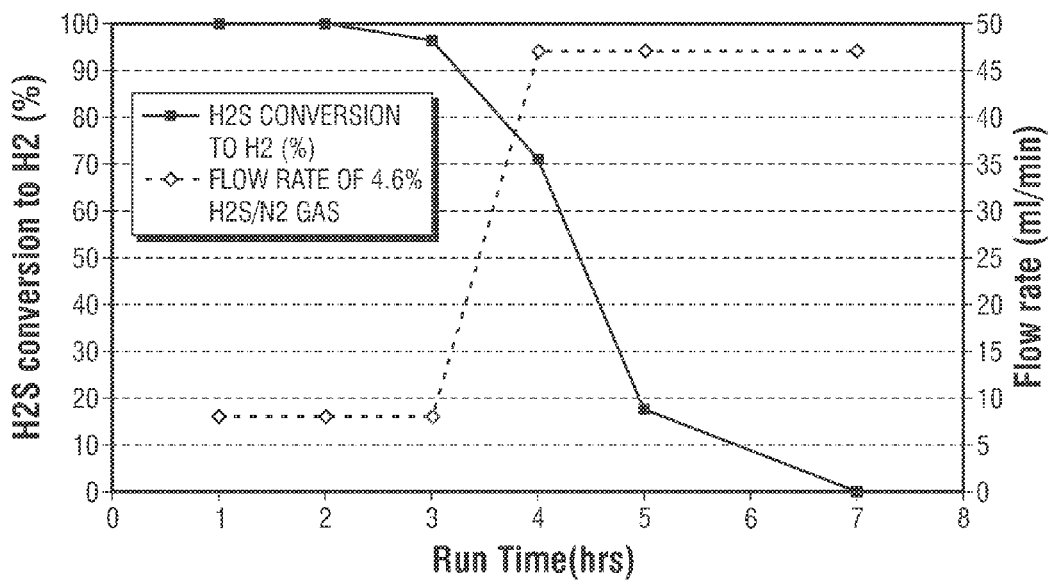
FIG. 15 is a plot showing conversion of $H_2S$ to $H_2$ using $Ni_3S_2$ at 500° C.
Figure 16:
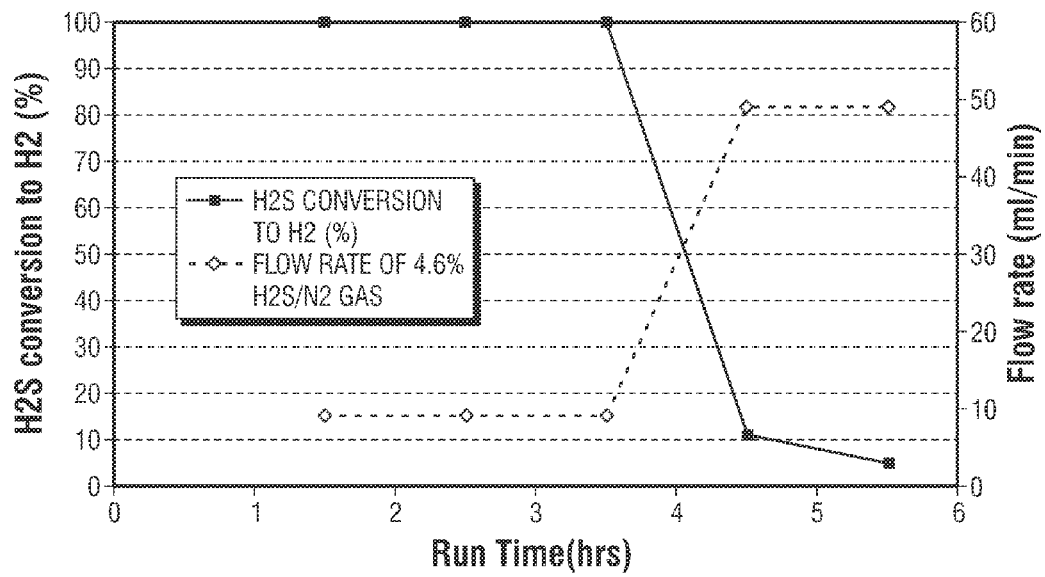
FIG. 16 is a plot showing conversion of $H_2S$ to $H_2$ using FeS at 400° C.
Figure 17:
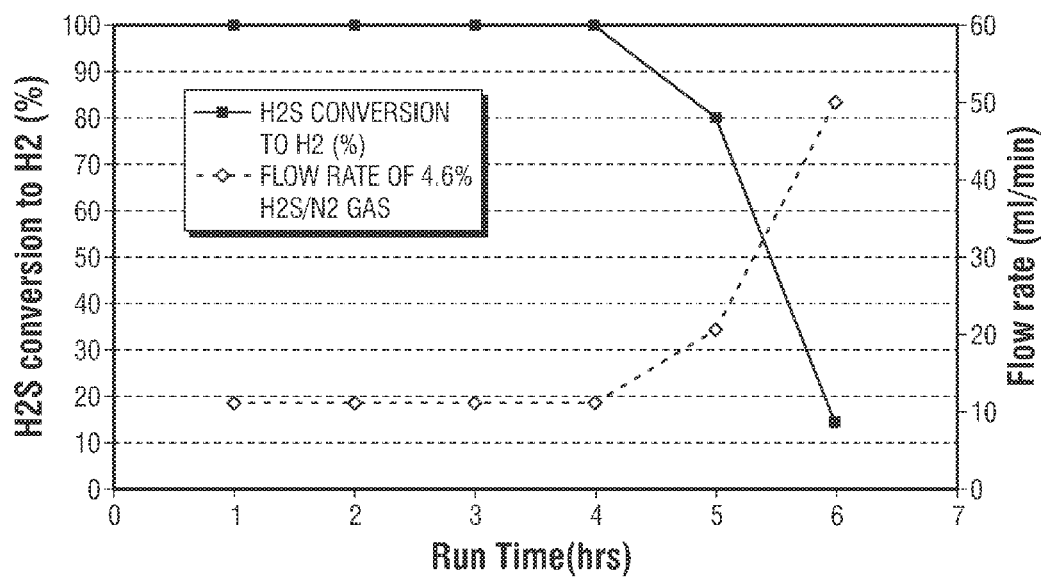
FIG. 17 is a plot showing conversion of $H_2S$ to $H_2$ using FeS at 500° C.

Sodium forms a number of multiple sulfides with the formula $Na_2S_x$ where x ranges from 2 to 6. It thus has the possible ability to capture large amounts of sulfur on a weight basis from hydrogen sulfide-containing streams. The results presented in FIG. 12 and FIG. 13 show that sulfides of sodium may be regenerated rapidly without forming oxides. Due to the low melting temperature of $Na_2S_4$, it would be expected to be useful in a low temperature metal sulfide process.

EXAMPLE 3

Fluid Bed Experiments

This Example 3 describes the fluid bed experiments conducted with $FeS_2$ and $NiS_2$ in which the metal sulfide is contacted with oxygen at an elevated temperature. These experiments demonstrate the regeneration characteristics of the higher metal sulfides to lower metal sulfides.

A laboratory quartz fluidized bed reactor setup was used in the experiments to study the two metal sulfides of $FeS_2$ and $NiS_2$/NiS. About 2 grams of the metal sulfide was placed inside a quartz fluidized bed reactor. The reactor was then flushed with oxygen-free nitrogen to eliminate traces of $O_2$. The reactor was then inserted into a hot sand bath to raise its temperature to 400 to 500° C. Once the desired temperature was reached, air was input into the reactor for a fixed amount of time to allow oxidation of the metal sulfide. The reactor was then flushed with $N_2$ to sweep away remaining oxygen. All the gases were passed through a cold chamber to knock out any sulfur produced. The gases were then collected in a gas bag for composition analysis by gas chromatography. The reactor was cooled and the solid products were removed and weighed.

The composition and phases of sulfides in the product solids were measured using X-ray Diffraction and Total Sulfur Analysis. For those cases in which the sulfur composition values determined by the two methods were within 20% of each other, the values were considered to be close enough for use in mass balance calculations.

The amount of elemental sulfur liberated by the metal sulfide was determined by the difference between the sulfur initially present in the solids and the sum of sulfur of the released $SO_2$ and sulfur in the product solids. Material balances were done on the metal content of the reactant and the product solids. Three values were checked: the sulfur content in the product, the sulfur liberated, and the metal mass balance. A summary of certain of the results of the experiments is presented in the following Table 1 (Results of Fluid Bed Regeneration Experiments on $FeS_2$) and Table 2 (Results of Fluid Bed Regeneration Experiments on $NiS_2/NiS$).

TABLE 1

Results of Fluid Bed Regeneration Experiments on $FeS_2$

| Run | | | | | |
|---|---|---|---|---|---|
| Catalyst Description | Iron sulfide | Iron sulfide | Iron sulfide | Iron sulfide | Iron sulfide |
| Gas to Bed | air | air | air | air | air |
| Gas Flow to Catalyst Bed (cc/min) | 1500 | 500 | 500 | 1500 | 600 |
| Minutes of Flow to Catalyst Bed | 2 | 2.5 | 7.5 | 1 | 1 |
| Total Gas Volume (cc) to Catalyst Bed | 3000 | 1250 | 3750 | 1500 | 600 |
| Rxn Temp (° C.) | 400 | 400 | 400 | 500 | 500 |
| Exotherm Temp Observed (° C.) | 438 | 405 | 401 | 516 | 505 |
| Oxygen Content of Product Solids (wt %) | 12.0 | 9.0 | 11.7 | 6.3 | 2.1 |
| Sulfur Yield in Product Gas (S/S + $SO_2$) Molar % | 80.28 | 59.60 | 30.27 | 78.46 | 53.55 |
| Moles S Lost per Moles S Initially | 1.025 | 0.670 | 0.884 | 0.852 | 0.139 |
| Sulfur Transfer Capacity: Sulfur Lost/Starting Material (wt. %) | 27.32 | 17.86 | 23.56 | 22.73 | 3.71 |

TABLE 2

Results of Fluid Bed Regeneration Experiments on $NiS_2/NiS$

| Run | | | | | | |
|---|---|---|---|---|---|---|
| Catalyst Description | $NiS_2/NiS$ | $NiS_2/NiS$ | $NiS_2/NiS$ | $NiS_2/NiS$ | $NiS_2/NiS$ | $NiS_2/NiS$ |
| Gas to Bed | air | air | air | air | air | none |
| Gas Flow to Catalyst Bed (cc/min) | 1500 | 1500 | 1548 | 1505 | 1500 | 0 |
| Minutes of Flow to Catalyst Bed | 5 | 10 | 4.5 | 15 | 2 | 0 |
| Total Gas Volume (cc) to Catalyst Bed | 7500 | 15000 | 6966 | 22575 | 3000 | 0 |
| Rxn Temp (° C.) | 400 | 400 | 500 | 420 | 420 | 420 |
| Exotherm Temp Observed (° C.) | 420 | 401 | 505 | 421 | 424 | 422 |
| Oxygen Content of Product Solids (wt %) | 0.9 | 0.4 | 0.9 | 1.7 | 2.5 | 3.0 |
| Sulfur Yield in Product Gas (S/S + $SO_2$) Molar % | 64.14 | 85.3 | 60.24 | 50.49 | | 98.00 |
| Moles S Lost per Moles S Initially | 0.445 | 0.445 | 0.411 | 0.528 | 0.569 | 0.151 |
| Sulfur Transfer Capacity: Sulfur Lost/Starting Material (wt. %) | 20.21 | 20.21 | 18.65 | 23.97 | 25.83 | 6.84 |

The results of these experiments show that for both $FeS_2$ and $NiS_2$ a high sulfur yield of close to 80% is viable. This high sulfur yield results in a minimization of $SO_2$ yield, which in a commercial process can result in reduced costs in the treatment of $SO_2$. A high sulfur transfer capacity of greater than 20% is achievable. This indicates that there is a selective removal of only one of the sulfur atoms from the higher metal sulfide of $FeS_2$ or $NiS_2$. The oxygen content of the product solids was kept reasonably low. It is desirable to minimize the oxygen content that is gained by the solids, since it will react with $H_2S$ to form $H_2O$ instead of $H_2$ leading to a loss in $H_2$ yield.

EXAMPLE 4

Packed Bed Experiments

This Example 4 describes the packed bed experiments conducted using lower sulfides of nickel and iron in order to determine the sulfur uptake characteristics of the metal sulfide and the characteristics of the metal sulfide in converting hydrogen sulfide to hydrogen at various reaction temperatures.

A number of experiments were carried out to determine the maximum $H_2S$ to $H_2$ conversion when using lower sulfides of Ni and Fe at various temperatures. In these experiments a packed bed of the sulfides was created in a quartz flow reactor.

The bed length was 24 inches and the sulfide was suspended over special quartz beads that can sustain high temperatures. The experiment was started with heating the bed under nitrogen to the desired reaction temperature followed by flow of a 4.63% $H_2S/N_2$ gas mixture. The outlet gas was collected at regular intervals in analytical bags for composition analysis using gas chromatography. The reactor was setup to permit a low gas velocity in the beginning so as to allow near thermodynamic equilibrium to be established between the reactants and products and the determination of the maximum possible conversions when starting with a gas stream containing only $H_2S$ and no $H_2$.

After initial data was obtained the flow was increased in order to deviate from equilibrium considerations. Results of the testing are summarized in FIGS. 12 through 15 and Table 3. Six runs were conducted in total. $Ni_3S_2$ was sulfided at two different temperatures of 400 and 500° C. Similar experiments were conducted with FeS. Long duration experiments were also conducted in order to determine the maximum sulfur uptake of these materials.

As is shown by FIGS. 14 through 17 the experiments showed complete conversion of $H_2S$ to $H_2$ in the initial reaction phase. The reaction slowed down and ultimately stopped as time progressed at higher flows.

The data indicates that a very high conversion of $H_2S$ to $H_2$ is possible if proper reactants, temperatures and contacting patterns are utilized.

The data presented in Table 3 show that the sulfur content of both $Ni_3S_2$ and FeS was seen to increase upon reaction. A higher sulfur content increase is expected if porous metal sulfides were used to allow complete conversion of the metal sulfide particles.

TABLE 3

Packed bed experiment results to determine maximum conversion of $H_2S$ to $H_2$ using non-porous metal sulfides.

| Purpose | Run 1 | Run 2 | Run 3 | Run 4 | Run 5 | Run 6 |
|---|---|---|---|---|---|---|
| | Conversion of $H_2S$ to $H_2$ | | | | Sulfur uptake on long exposure | |
| Temperature (° C.) | 400 | 500 | 400 | 500 | 400 | 400 |
| Gas rate (ml/hr/g starting material) | 23.53 | 24.00 | 25.73 | 20.73 | | |
| Starting Material | $Ni_3S_2$ | $Ni_3S_2$ | FeS | FeS | FeS | $Ni_3S_2$ |
| Sulfur Content (%) Product | 30.93 | 30.93 | 30.67 | 30.67 | 30.67 | 30.93 |
| Top 25% bed Sulfur Content (%) | 37.37 | 39 | 35.93 | 34.4 | 37.23 | 37.83 |
| Bottom 75% bed Sulfur Content (%) | 35.3 | 37.5 | 32.17 | 30.07 | | |
| Maximum $H_2S$ to $H_2$ conversion observed | 100 | 100 | 100 | 100 | NA | NA |
| Moles $H_2S$ consumed v/s $H_2S$ required to make $NiS_2$ or $FeS_2$ (%) | 10.6 | 15.2 | 11.4 | 19.4 | | |

That which is claimed is:

1. A process for making hydrogen, sulfur and sulfur dioxide from hydrogen sulfide, wherein said process comprises:
    introducing a gas stream comprising hydrogen sulfide into a sulfidation zone, operated under suitable sulfidation conditions and containing a lower metal sulfide, and contacting therein said gas stream with said lower metal sulfide to thereby yield molecular hydrogen and a higher metal sulfide;
    passing from said sulfidation zone a treated gas stream containing molecular hydrogen and having a reduced hydrogen sulfide concentration;
    passing from said sulfidation zone said higher metal sulfide and introducing it into a regeneration zone;
    introducing a sub-stoichiometric amount of molecular oxygen into said regeneration zone and contacting said higher metal sulfide with said molecular oxygen for a short contacting time to thereby convert said higher metal sulfide to said lower metal sulfide and to yield sulfur dioxide and elemental sulfur;
    passing from said regeneration zone said lower metal sulfide and introducing it into said sulfidation zone; and
    passing from said regeneration zone a regeneration zone effluent comprising sulfur dioxide and elemental sulfur.

2. A process as recited in claim 1, further comprising:
    condensing elemental sulfur from said regeneration zone effluent to yield a sulfur condenser effluent stream having a sulfur condenser effluent stream having a sulfur dioxide concentration and a reduced sulfur concentration.

3. A process as recited in claim 2, further comprising:
    passing said sulfur condenser effluent stream to a sulfuric acid production unit whereby the sulfur dioxide is used as a reactant for the production of sulfuric acid.

4. A process as recited in claim 3, wherein said lower metal sulfide is a metal sulfide selected from the group consisting of FeS, $Fe_7S_8$, NiS, $Ni_2S_3$, CoS, $Co_9S_8$, $Sn_3S_4$, $Na_2S$, $Na_2S_2$ and $Na_2S_3$.

5. A process as recited in claim 4, wherein said suitable sulfidation conditions include a sulfidation reaction temperature within said sulfidation zone that is in the range of from 150° C. to 700° C., a sulfidation reaction pressure in the range of from about atmospheric to about 13,840 kPa, and a molar ratio of said lower metal sulfide to $H_2S$ within said sulfidation zone is in the range of from 0.1:1 to 10:1.

6. A process as recited in claim 5, wherein said suitable regeneration conditions include a regeneration reaction temperature within said regeneration zone that is in the range of from 200° C. to 900° C., and a regeneration reaction pressure in the range of form about atmospheric to about 13,840 kPa.

7. A process as recited in claim 6, wherein said reduced hydrogen sulfide concentration of said treated gas stream is less than 100,000 ppmv (10 vol. %).

8. A process as recited in claim 7, wherein said sub-stoichiometric amount of molecular oxygen is less than 1.

9. A process as recited in claim 8, wherein the molar ratio of S to S plus $SO_2$ in said regeneration zone effluent is in the range of from 0.1 to about 0.95.

10. A process as recited in claim 2, wherein said lower metal sulfide is a metal sulfide selected from the group consisting of FeS, $Fe_7S_8$, NiS, $Ni_2S_3$, CoS, $Co_9S_8$, $Sn_3S_4$, $Na_2S$, $Na_2S_2$ and $Na_2S_3$.

11. A process as recited in claim 10, wherein said suitable sulfidation conditions include a sulfidation reaction temperature within said sulfidation zone that is in the range of from 150° C. to 700° C., a sulfidation reaction pressure in the range of from about atmospheric to about 13,840 kPa, and a molar ratio of said lower metal sulfide to $H_2S$ within said sulfidation zone is in the range of from 0.1:1 to 10:1.

12. A process as recited in claim 11, wherein said suitable regeneration conditions include a regeneration reaction temperature within said regeneration zone that is in the range of from 200° C. to 900° C., and a regeneration reaction pressure in the range of form about atmospheric to about 13,840 kPa.

13. A process as recited in claim 12, wherein said reduced hydrogen sulfide concentration of said treated gas stream is less than 100,000 ppmv (10 vol. %).

14. A process as recited in claim 13, wherein said sub-stoichiometric amount of molecular oxygen is less than 1.

15. A process as recited in claim 14, wherein the molar ratio of S to S plus $SO_2$ in said regeneration zone effluent is in the range of from 0.1 to about 0.95.

16. A process as recited in claim 1, wherein said lower metal sulfide is a metal sulfide selected from the group consisting of FeS, $Fe_7S_8$, NiS, $Ni_2S_3$, CoS, $Co_9S_8$, $Sn_3S_4$, $Na_2S$, $Na_2S_2$ and $Na_2S_3$.

17. A process as recited in claim 16, wherein said suitable sulfidation conditions include a sulfidation reaction temperature within said sulfidation zone that is in the range of from 150° C. to 700° C., a sulfidation reaction pressure in the range of from about atmospheric to about 13,840 kPa, and a molar ratio of said lower metal sulfide to $H_2S$ within said sulfidation zone is in the range of from 0.1:1 to 10:1.

18. A process as recited in claim 17, wherein said suitable regeneration conditions include a regeneration reaction temperature within said regeneration zone that is in the range of from 200° C. to 900° C., and a regeneration reaction pressure in the range of form about atmospheric to about 13,840 kPa.

19. A process as recited in claim 18, wherein said reduced hydrogen sulfide concentration of said treated gas stream is less than 100,000 ppmv (10 vol. %).

20. A process as recited in claim 19, wherein said sub-stoichiometric amount of molecular oxygen is less than 1.

21. A process as recited in claim 20, wherein the molar ratio of S to S plus $SO_2$ in said regeneration zone effluent is in the range of from 0.1 to about 0.95.

* * * * *